United States Patent
Urban

(10) Patent No.: US 12,342,420 B2
(45) Date of Patent: Jun. 24, 2025

(54) METHOD OF COORDINATING MULTIPLE INSTANCES OF USER PLANE TRAFFIC PROCESSING IN A DATA NETWORK

(71) Applicant: Rohde & Schwarz GmbH & Co. KG, Munich (DE)

(72) Inventor: Stefan Urban, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 519 days.

(21) Appl. No.: 17/570,052

(22) Filed: Jan. 6, 2022

(65) Prior Publication Data
US 2023/0217239 A1  Jul. 6, 2023

(51) Int. Cl.
| | |
|---|---|
| H04W 8/18 | (2009.01) |
| H04L 43/10 | (2022.01) |
| H04W 8/26 | (2009.01) |
| H04W 76/15 | (2018.01) |

(52) U.S. Cl.
CPC ............ *H04W 8/183* (2013.01); *H04L 43/10* (2013.01); *H04W 8/26* (2013.01); *H04W 76/15* (2018.02)

(58) Field of Classification Search
CPC ....... H04W 8/183; H04W 76/15; H04W 8/26; H04W 88/00; H04W 28/084; H04W 76/12; H04W 88/14; H04W 88/18; H04L 43/00; H04L 43/10; G06F 9/5033; G06F 9/485; G06F 9/54
See application file for complete search history.

(56) References Cited

U.S. PATENT DOCUMENTS

| | | | |
|---|---|---|---|
| 7,707,583 B2 | 4/2010 | Schmidt et al. | |
| 8,707,323 B2 | 4/2014 | Galchev et al. | |
| 2017/0351441 A1 | 12/2017 | Marinescu | |
| 2018/0302877 A1* | 10/2018 | Bosch | H04W 68/02 |
| 2021/0329496 A1* | 10/2021 | Koodli | H04W 28/082 |

* cited by examiner

*Primary Examiner* — Ankur Jain
(74) *Attorney, Agent, or Firm* — CHRISTENSEN O'CONNOR JOHNSON KINDNESS PLLC

(57) ABSTRACT

A method of coordinating multiple instances of user plane traffic processing in a data network is described. The method includes the following steps: receiving control plane data from at least one basis station by a control plane of the data network, wherein the control plane data is associated with at least two subscribers connected to the at least one basis station; generating subscriber and user plane session data based on the received control plane data by a subscriber and session collector module, wherein the subscriber and user plane session data is associated with the at least two subscribers; selecting a user plane function instance out of a plurality of user plane function instances based on the subscriber and user plane session data by a load balancing module, wherein the selected user plane function instance is associated with exactly one subscriber; receiving user plane data from the at least one basis station, wherein the user plane data is associated with the at least two subscribers; and processing at least a portion of the user plane data by the selected user plane function instance. Further, a data network is described.

18 Claims, 2 Drawing Sheets

METHOD OF COORDINATING MULTIPLE INSTANCES OF USER PLANE TRAFFIC PROCESSING IN A DATA NETWORK

FIELD OF THE DISCLOSURE

Embodiments of the present disclosure generally relate to methods of coordinating multiple instances of user plane traffic processing in a data network. Embodiments of the present disclosure further relate to data networks.

BACKGROUND

With bandwidths of data networks becoming higher and higher, it becomes increasingly more important to process data traffic in a highly parallel fashion. This especially holds for data networks that are associated with mobile communication networks operating under the 5G standard.

Typically, a plurality of subscribers share certain resources of the respective data network, such as memory or processing units that are distributed in the data network.

Due to this sharing of resources, load balancing is becoming more important in order to ensure that the shared resources can be accessed by all subscribers in a consistent manner, and particularly in order to ensure that data provided by the shared resources stays consistent.

Thus, there is a need for a method of coordinating multiple instances of user plane traffic processing in a data network and for a data network that enable parallel processing of data under the use of shared resources in a consistent manner.

SUMMARY

Embodiments of the present disclosure provide methods of coordinating multiple instances of user plane traffic processing in a data network. In an embodiment, the method comprises the following steps:
  receiving control plane data from at least one base station by a control plane of the data network, wherein the control plane data is associated with at least two subscribers connected to the at least one base station;
  generating subscriber and user plane session data based on the received control plane data by a subscriber and session collector circuit, wherein the subscriber and user plane session data is associated with the at least two subscribers;
  selecting a user plane function instance out of a plurality of user plane function instances based on the subscriber and user plane session data by a load balancing circuit, wherein the selected user plane function instance is associated with exactly one subscriber;
  receiving user plane data from the at least one base station, wherein the user plane data is associated with the at least two subscribers; and
  processing at least a portion of the user plane data by the selected user plane function instance.

Therein and in the following, the term "subscriber" is understood to denote a user-side electronic device or a group of user-side electronic devices. However, it is to be understood that a single subscriber may have several IP addresses, for example a single subscriber may have multiple IP addresses that are associated with different slices of the data network, particularly with different slices of a data network operating under the 5G standard.

In the context of the present disclosure, the term "base station" is understood to denote one or several electronic devices that are configured to establish a connection between a subscriber-side electronic device and a data network. Accordingly, the base station is configured to receive user plane data and control plane data from a subscriber, and to distribute the user plane data and the control plane data to the appropriate modules of the data network. For example, the base station may be a base station of a data network under the 5G standard.

Methods according to the present disclosure are based on the idea to add two additional circuits having dedicated functionalities for load balancing. In some embodiments, the additional circuits ensure a correct usage of shared resources of the data network by multiple subscribers, namely the subscriber and session collector circuit, and the load balancing circuit.

The subscriber and session collector circuit collects all subscriber and user plane session data associated with the at least two subscribers from the control plane of the data network and provides that data to the load balancing circuit. In other words, the subscriber and session collector circuit provides all necessary subscriber information, for example subscriber information on each of the subscribers, and all necessary session information, for example session information associated with each of the subscribers, to the load balancing circuit.

In some embodiments, the subscriber and user plane session data comprises information on shared resources of the data network that are necessary for processing the user plane data associated with the individual subscribers.

Based on the received subscriber and user plane session data, the load balancing circuit selects the appropriate user plane function instance to process the user plane data received. Accordingly, the load balancing circuit may decide which is the next user plane function instance that is allowed to access the shared resources of the data network, for example a shared memory or shared processing units of the data network. Thus, it is ensured that the shared resources are used in an optimal and consistent way.

For example, multiple simultaneous write-attempts on the same portion of a shared memory are reliably prevented, as the load balancing circuit may allow only a single user plane function instance to write on the respective portion of the shared memory at a time.

Thus, embodiments of the method allow for processing user plane data from multiple subscribers in a highly parallel fashion, namely by the multiple user plane function instances. However, embodiments of the method ensures that shared resources are used in a consistent manner that does not lead to inconsistencies of the shared data.

Thus, it is not necessary to implement locking and/or concurrency detection on shared resources of the data network, for example in a shared memory.

The data network may be a data network under the 5G standard, for example a core data network under the 5G standard. Accordingly, the control plane and the user plane (functions) may be established under the 5G standard.

The user plane function instances may be associated with exactly one subscriber, respectively. Thus, the user plane function instances may process only a portion of the user plane data associated with the exactly one subscriber, respectively.

In some embodiments, each subscriber may be associated with exactly one user plane function instance. Thus, it is ensured that each user plane function instance processes only a portion of the user plane data associated with the respective subscriber at a time. Generally, the shared memory is allocated based on subscriber allocation from the control plane for user plane functions, e.g. not based on IP address or user account.

According to an aspect of the present disclosure, the selected user plane function instance accesses a shared memory. In other words, the user plane function instance selected by the load balancing circuit is allowed to access the shared memory.

The shared memory may be implemented in a server (e.g., server computer) of the data network. However, it is to be understood that the term "shared memory" may also relate a memory that is distributed over several electronic devices of the data network.

According to a further aspect of the present disclosure, the selected user plane function instance reads from the shared memory and/or writes onto the shared memory. In other words, the user plane function instance selected by the load balancing circuit is allowed to read from the shared memory and/or write onto the shared memory.

In an embodiment of the present disclosure, the selected user plane function instance is the only user plane function instance accessing the shared memory at a time. In other words, the load balancing circuit allows only a single user plane function instance to access the shared memory at a time. Accordingly, multiple write operations associated with different subscribers onto the same shared memory or onto the same portion of the shared memory are reliably prevented, such that consistency of the data saved in the shared memory is ensured.

A further aspect of the present disclosure provides that the selected user plane function instance in one or more embodiments receives processing data from the shared memory. As already described above, the selected user plane function instance is associated with exactly one subscriber. Accordingly, the processing data may be associated with that particular subscriber, such that only relevant processing data is transmitted to the user plane function instance for further processing.

In some embodiments, each subscriber may be associated with exactly one user plane function instance. Thus, it is ensured that each user plane function instance processes only a portion of the user plane data associated with the respective subscriber at a time.

In a further embodiment of the present disclosure, the processing data comprises data that is necessary for processing the user plane data. For example, the processing data may relate to further subscriber information that is necessary for processing the user plane data, for example subscriber information that is associated with the exactly one subscriber.

Alternatively or additionally, the processing data comprises further data to be processed by the selected user plane function instance. The processing data may be associated with the exactly one subscriber, such that only the appropriate processing data is transmitted to the selected user plane function instance for further processing.

According to a further aspect of the present disclosure, the shared memory comprises, in some embodiment, a plurality of memory subunits, wherein different subunits are associated with different providers or with different subscribers. Accordingly, the load balancing circuit may select a plurality of user plane function instances, wherein different selected user plane function instances are granted access to different memory subunits. Thus, different memory subunits may be accessed by different selected user plane function instances in parallel. However, each memory subunit may be accessed by only a single selected user plane function instance at a time.

In some embodiments, different memory subunits dedicated to different subscribers may be accessed by different selected user plane function instances in parallel. In other words, each subscriber may be associated with exactly one user plane function instance and only that user plane function instance may access the respective memory subunit(s) dedicated to the respective subscriber at a time.

In an embodiment of the present disclosure, at least one of the at least two subscribers has at least two different IP addresses. For example, the at least one of the at least two subscribers may have multiple IP addresses that are associated with different slices of the data network, for example with different slices of a data network under the 5G standard.

Another aspect of the present disclosure provides that the plurality of user plane function instances are, in some embodiments, functionally identical. In other words, the different user plane function instances are identical copies of a user plane function. Thus, it is ensured that the user plane data associated with the at least two subscribers is processed by the same user plane function, albeit by different instances of that user plane function.

In some embodiments, the control plane comprises access management functions, mobility management functions, session management functions, subscriber information functions, and/or policy information functions. Additional information provided by these functions that is associated with the at least two subscribers may be collected by the subscriber and session collector circuit, and may be forwarded to the load balancing circuit. The load balancing circuit may select the user plane function instance based on the additional information provided.

In a further embodiment of the present disclosure, the subscriber and user plane session data comprises information on the assignment of the at least two subscribers to user plane tunnels. Thus, the information on the assignment of the at least two subscribers to user plane tunnels is taken into account by the load balancing circuit when selecting the user plane function instance.

According to another aspect of the present disclosure, different user plane function instances that are associated with different subscribers are, in some embodiments, selected consecutively and/or in parallel.

In other words, the load balancing circuit may allow a plurality of user plane function instances to process the user plane data in parallel, as long as no conflict between the individual user plane function instances arises with respect to the shared resources, for example with respect to a shared memory.

If at least two user plane function instances need to access the same shared resource, the load balancing circuit may control these at least two user plane function instances to consecutively process the user plane data, such that the shared resources are accessed in a consistent manner.

A deep packet inspection may be performed by the selected user plane function instance. The deep packet inspection may be performed based on processing data provided by a shared memory, as described above.

However, the selected user plane function instance may process the user plane data in any other suitable way, for example in any way provided under the 5G standard.

Embodiments of the present disclosure further provide a data network. In an embodiment, the data network comprises at least one base station, a control plane, a subscriber and session collector circuit, a load balancing circuit, and a plurality of user plane function instances. The at least one base station is configured to generate control plane data, wherein the control plane data is associated with at least two subscribers connected to the at least one base station. The at least one base station further is configured to generate user plane data, wherein the user plane data is associated with the at least two subscribers. The subscriber and session collector circuit is configured to generate subscriber and user plane session data based on the received control plane data. The load balancing circuit is configured to select a user plane function instance out of the plurality of user plane function instances based on the subscriber and user plane session data, wherein the selected user plane function instance is associated with exactly one subscriber. The selected user plane function instance is configured to process at least a portion of the user plane data.

In some embodiments, the data network is configured to perform the method of coordinating multiple instances of user plane traffic processing in a data network described above.

Regarding the further advantages and properties of the data network, reference is made to the explanations given above with respect to the method of coordinating multiple instances of user plane traffic processing in a data network, which also hold for the data network and vice versa.

According to an aspect of the present disclosure, the data network further comprises a shared memory that is connectable to the plurality of user plane function instances. The user plane function instance selected by the load balancing circuit may be allowed to access the shared memory, i.e., to read from the shared memory and/or to write onto the shared memory.

In some embodiments, the selected user plane function instance is the only user plane function instance that is granted access to the shared memory at a time.

The shared memory may be implemented in a server of the data network. However, it is to be understood that the term "shared memory" may also relate a memory that is distributed over several electronic devices of the data network.

The shared memory may comprise a plurality of memory subunits, wherein different subunits are associated with different providers or with different subscribers. Accordingly, the load balancing circuit may select a plurality of user plane function instances, wherein different selected user plane function instances are granted access to different memory subunits. Thus, different memory subunits may be accessed by different selected user plane function instances in parallel. However, each memory subunit may be accessed by only a single selected user plane function instance at a time.

In some embodiments, different memory subunits dedicated to different subscribers may be accessed by different selected user plane function instances in parallel. In other words, each subscriber may be associated with exactly one user plane function instance and only that user plane function instance may access the respective memory subunit(s) dedicated to the respective subscriber at a time.

The memory subunits may correspond to different portions of a single memory. Alternatively or additionally, the memory subunits may correspond to different memories that are distributed over different electronic devices.

According to another aspect of the present disclosure, the data network is established, for example, under the 5G standard. In some embodiments, the data network may be established as a core data network under the 5G standard. Accordingly, the control plane and the user plane (functions) may be established under the 5G standard.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
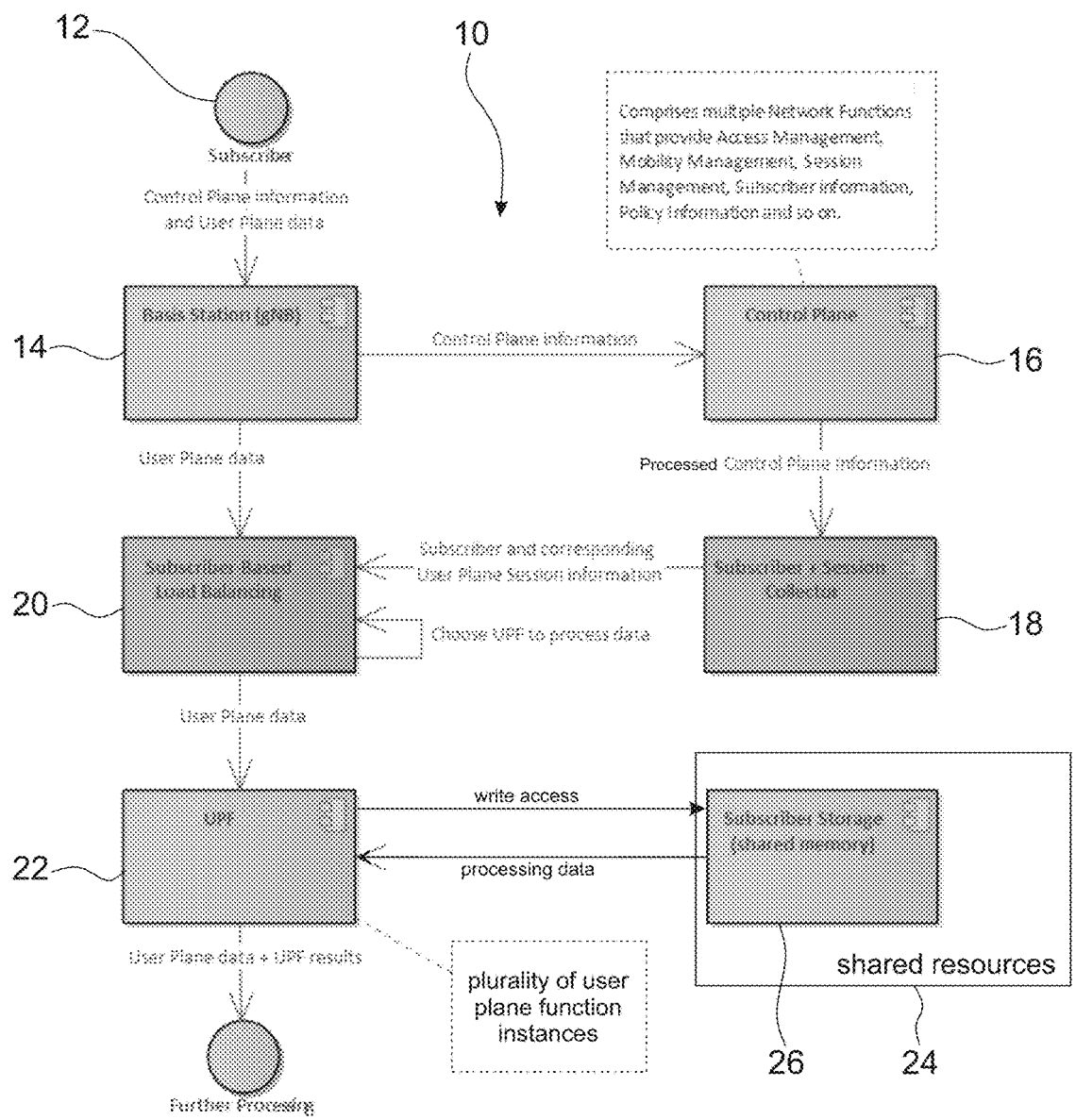
FIG. 1 schematically shows a data network according to an embodiment of the present disclosure.

FIG. 1 schematically shows an example of a data network 10 that is established as a data network under the 5G standard, for example as a core data network under the 5G standard. Accordingly, the terms "control plane", "user plane" and the different "functions" mentioned below are to be understood as specified in the 5G standard.

In general, the data network 10 is configured to process control plane information and user plane data received from a plurality of (mobile) subscribers 12 that are connected to one or several base stations 14 of the data network 10.

Therein and in the following, the term "subscriber" is understood to denote a user-side electronic device or a group of user-side electronic devices. For example, the user-side electronic device(s) may be a smartphone, a tablet, or any other electronic device that is configured to communicate under the 5G standard. However, it is to be understood that a single subscriber 12 may have several IP addresses. For example, a single subscriber 12 may have multiple IP addresses that are associated with different slices of the data network 10.

In the embodiment shown, the data network 10 comprises a control plane 16 that is connected with the at least one base station 14, and subscriber and session collector circuitry (one or more circuits) 18 that is connected with the control plane 16. In an embodiment, the subscriber and session collector circuitry can be implemented as a module. The term "module" in some embodiments refers to or includes, inter alia, hardware (e.g. a processor such as an integrated circuit, digital circuits or other circuitry), software (e.g. machine- or processor-executable instructions, commands, or code such as firmware, programming, or object code), or a combination of hardware and software that is configured to have a certain functionality. Thus, these modules may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

It is to be understood that the circuitry (or module) may be established by a single electronic device or even by a portion of a single electronic device. However, the circuitry (or module) may also be established by a plurality of electronic devices that are interconnected.

The data network 10 further comprises load balancing circuitry (one or more circuits) 20 that is connected with the at least one base station 14 and with the subscriber and session collector circuitry 18. In some embodiments, the load balancing module 20 can be considered to be a specific type of user plane function. In an embodiment, the load balancing circuitry can be implemented as a module.

The data network 10 further comprises a plurality of user plane function instances 22, wherein the user plane function instances 22 are, for example, functionally identical. In other words, the different user plane function instances 22 are identical copies of the same user plane function in some embodiments.

The data network 10 further comprises shared resources 24 that may be accessed by all or at least a certain subset of the subscribers 12, or rather by the user plane function instances 22 associated with the subscribers 12. This will be described in more detail below.

The shared resources 24 comprise a shared memory 26, wherein processing data associated with the individual subscribers 12 is saved in the shared memory 26. For example, the shared memory 26 may be implemented in a server of the data network 10. However, it is to be understood that the shared memory 26 may also relate to a memory that is distributed over several electronic devices of the data network 10.

The shared memory 26 may comprise a plurality of memory subunits, wherein different subunits are associated with different providers or with different subscribers 12. Alternatively or additionally, the memory subunits may correspond to different portions of a single memory.

Figure 2:
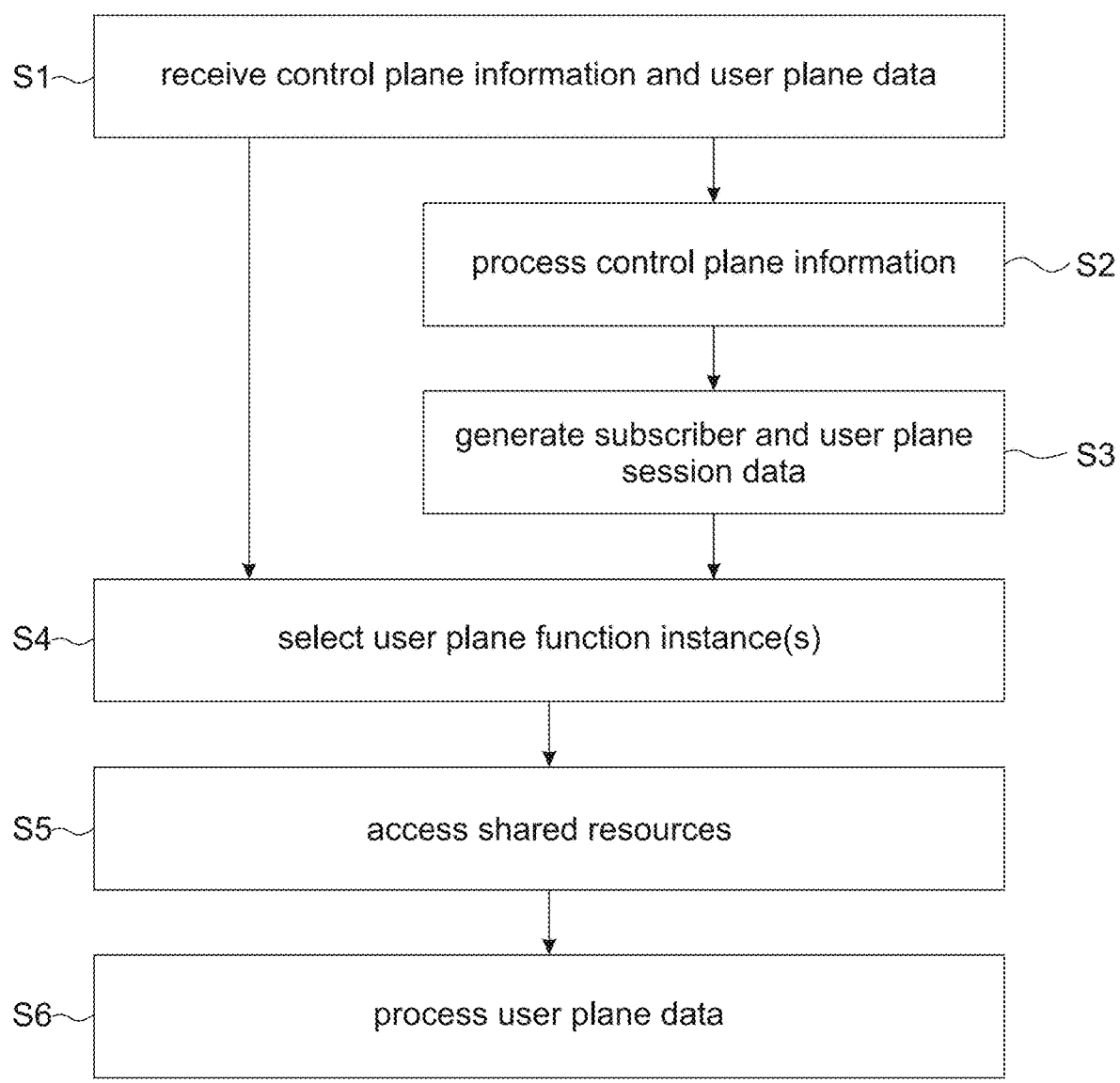
FIG. 2 shows a representative flow chart of a method of coordinating multiple instances of user plane traffic processing in a data network according to an embodiment of the present disclosure.

The data network 10 is configured to perform one or more methods of coordinating multiple instances of user plane traffic processing in a data network. One embodiment of the method is described in the following with reference to FIG. 2.

Control plane information and user plane data is received from the subscribers 12 by the at least one base station 14 (step S1). The control plane information is forwarded to the control plane 16, while the user plane data is forwarded to the load balancing circuitry 20. The control plane information is processed by the control plane 16, thereby obtaining processed control plane information (step S2).

In general, the control plane 16 comprises several different functions that provide different types of information. For example, the control plane 16 comprises access management functions providing access management information, mobility management functions providing mobility management information, session management functions providing session management information, subscriber information functions providing subscriber information, and/or policy information functions providing policy information.

The processed control plane information is forwarded to the subscriber and session collector circuitry 18.

Subscriber and user plane session data is generated by the subscriber and session collector circuitry 18 based on the processed control plane information (step S3). The subscriber and user plane session data comprises all information that is necessary for performing the steps of the method described below, for example step S4 described below.

Accordingly, the subscriber and session collector circuitry 18 provides all necessary subscriber information, for example subscriber information on each of the subscribers 12, and all necessary session information, for example session information associated with each of the subscribers 12, to the load balancing circuitry 20.

At least one user plane function instance 22 is selected out of the plurality of user plane function instances 22 based on the subscriber and user plane session data by the load balancing circuitry 20 (step S4).

Therein, the at least one selected user plane function instance 22 is associated with exactly one subscriber 12. In some embodiments, each subscriber 12 may be associated with exactly one user plane function instance 22. However, multiple user plane function instances 22 that are associated with different subscribers 12 may be selected consecutively and/or in parallel.

The load balancing circuitry 20 may select a plurality of user plane function instances 22 in parallel, as long as no conflict between the individual user plane function instances 22 arises with respect to the shared resources 24, for example with respect to a shared memory 26.

In other words, if different user plane function instances 22 do not need to access the same shared resources 24 and/or the same portion of the shared memory 26, the corresponding user plane function instances 22 may be selected in parallel.

However, if at least two user plane function instances 22 need to access the same shared resource 24 and/or the same portion of the shared memory 26, the load balancing circuitry 20 may select these at least two user plane function instances 22 consecutively, such that each shared resource 24 and each portion of the shared memory 26 is accessed by only one user plane function instance 22 at a time.

The selected user plane function instances 22 access the shared resources 24, for example the shared memory 26 (step S5). The selected user plane function instances 22 receive processing data from the shared memory 26, write data onto the shared memory 26, and/or access other shared resources 24, such as shared processing units.

Put differently, the load balancing circuitry 20 decides which is the next user plane function instance 22 that is allowed to access the shared resources 24 of the data network 10, i.e. the shared memory 26 or shared processing units of the data network 10. Thus, it is ensured that the shared resources 24 are used in an optimal and consistent way.

For example, multiple simultaneous write-attempts on the same portion of the shared memory 26 are reliably prevented, as the load balancing circuitry 20 may allow only a single user plane function instance 22 to write on the respective portion of the shared memory 26 at a time.

As already described above, the selected user plane function instances 22 are associated with exactly one subscriber 12, respectively. Accordingly, the selected user plane function instances 22 may receive only processing data that is associated with the respective subscriber 12 from the shared memory 26.

The processing data may correspond to data that is necessary for processing the user plane data. For example, the processing data may relate to further subscriber information that is necessary for processing the user plane data, namely further subscriber information that is associated with the respective subscriber 12.

Alternatively or additionally, the processing data may comprise further data to be processed by the selected user plane function instances 22.

The user plane data is processed by the selected user plane function instance(s) 22 (step S6). In general, the selected user plane function instances 22 respectively process a portion of the user plane data that is associated with the subscriber 12 associated with the respective selected user plane function instance 22. Thus, the user plane data corresponding to different subscribers 12 is processed in parallel and/or consecutively by the selected user plane function instances 22.

In some embodiments, the user plane data and the processing data received from the shared memory 26 may be processed by the selected user plane function instances 22. Alternatively or additionally, the user plane data is processed by the selected user plane function instances 22 based on the processing data received from the shared memory 26.

For example, a deep packet inspection may be performed by the selected user plane function instances 22. The deep packet inspection may be performed based on the processing data provided by the shared memory 26, as described above.

However, the selected user plane functions 22 may process the user plane data in any other suitable way, for example in any way provided under the 5G standard.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

It should now be appreciated that some embodiments of the present disclosure, or portions thereof, have been described in the general context of computer code or machine-useable instructions, including computer-executable instructions such as program modules, being executed by a computing system, or other machine or machines. Some of these embodiments or others may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

It is to be understood that the circuits and/or its functionality may be established by a single electronic device or even by a portion of a single electronic device. However, the circuits and/or its functionality may also be established by a plurality of electronic devices that are interconnected, e.g. a network of electronic devices.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of coordinating multiple instances of user plane traffic processing in a data network, the method comprising the following steps:
   receiving control plane data from at least one base station by a control plane of the data network, wherein the control plane data is associated with at least two subscribers connected to the at least one base station;
   generating subscriber and user plane session data based on the received control plane data by a subscriber and session collector circuit, wherein the subscriber and user plane session data is associated with the at least two subscribers, wherein the subscriber and user plane session data comprises information on shared resources of the data network that are necessary for processing the user plane data associated with the individual subscribers;
   selecting a user plane function instance out of a plurality of user plane function instances based on the subscriber and user plane session data by a load balancing circuit, wherein the selected user plane function instance is associated with exactly one subscriber;
   receiving user plane data from the at least one base station, wherein the user plane data is associated with the at least two subscribers; and
   processing at least a portion of the user plane data by the selected user plane function instance, wherein the selected user plane function instance is allowed to access the shared resources of the data network.

2. The method of claim 1, wherein the selected user plane function instance accesses a shared memory.

3. The method of claim 2, wherein the selected user plane function instance reads from the shared memory and/or writes onto the shared memory.

4. The method of claim 2, wherein the selected user plane function instance is the only user plane function instance accessing the shared memory at a time.

5. The method of claim 2, wherein the selected user plane function instance receives processing data from the shared memory.

6. The method of claim 5, wherein the processing data comprises data that is necessary for processing the user plane data.

7. The method of claim 5, wherein the processing data comprises further data to be processed by the selected user plane function instance.

8. The method of claim 2, wherein the shared memory comprises a plurality of memory subunits, wherein different subunits are associated with different providers or with different subscribers.

9. The method of claim 1, wherein at least one of the at least two subscribers has at least two different IP addresses.

10. The method of claim 1, wherein the plurality of user plane function instances are functionally identical.

11. The method of claim 1, wherein the control plane comprises access management functions, mobility management functions, session management functions, subscriber information functions, and/or policy information functions.

12. The method of claim 1, wherein the subscriber and user plane session data comprises information on the assignment of the at least two subscribers to user plane tunnels.

13. The method of claim 1, wherein different user plane function instances that are associated with different subscribers are selected consecutively and/or in parallel.

14. The method of claim 1, wherein a deep packet inspection is performed by the selected user plane function instance.

15. A data network, the data network comprising at least one base station, a control plane, a subscriber and session collector circuit, a load balancing circuit, and a plurality of user plane function instances,
- wherein the at least one base station is configured to generate control plane data, wherein the control plane data is associated with at least two subscribers connected to the at least one base station,
- wherein the at least one base station further is configured to generate user plane data, wherein the user plane data is associated with the at least two subscribers,
- wherein the subscriber and session collector circuit is configured to generate subscriber and user plane session data based on the received control plane data, wherein the subscriber and user plane session data comprises information on shared resources of the data network that are necessary for processing the user plane data associated with the individual subscribers,
- wherein the load balancing circuit is configured to select a user plane function instance out of the plurality of user plane function instances based on the subscriber and user plane session data, wherein the selected user plane function instance is associated with exactly one subscriber, and
- wherein the selected user plane function instance is configured to process at least a portion of the user plane data, wherein the selected user plane function instance is allowed to access the shared resources of the data network.

16. The data network of claim 15, further comprising a shared memory that is connectable to the plurality of user plane function instances.

17. The data network of claim 15, wherein the data network is established according to the 5G standard.

18. A data network, the data network comprising:
- at least one base station configured to generate control plane data, the control plane data being associated with at least two subscribers connected to the at least one base station, wherein the at least one base station further is configured to generate user plane data, the user plane data being associated with the at least two subscribers;
- a control plane;
- a subscriber and session collector circuit configured to generate subscriber and user plane session data based on the received control plane data, wherein the subscriber and user plane session data comprises information on shared resources of the data network that are necessary for processing the user plane data associated with the individual subscribers;
- a plurality of user plane function instances; and
- a load balancing circuit configured to select a user plane function instance out of the plurality of user plane function instances based on the subscriber and user plane session data, wherein the selected user plane function instance is associated with exactly one subscriber;
- wherein the selected user plane function instance is configured to process at least a portion of the user plane data, wherein the selected user plane function instance is allowed to access the shared resources of the data network,
- wherein the data network comprises a shared memory that is connectable to the plurality of user plane function instances, and
- wherein the selected user plane function instance is the only user plane function instance that is allowed to access the shared memory.

* * * * *